US012317059B2

(12) United States Patent
Jax et al.

(10) Patent No.: US 12,317,059 B2
(45) Date of Patent: *May 27, 2025

(54) METHOD AND APPARATUS FOR SCREEN RELATED ADAPTATION OF A HIGHER-ORDER AMBISONICS AUDIO SIGNAL

(71) Applicant: Dolby Laboratories Licensing Corporation, San Francisco, CA (US)

(72) Inventors: Peter Jax, Hannover (DE); Johannes Boehm, Göttingen (DE); William G. Redmann, Los Angeles, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,528

(22) Filed: Feb. 2, 2024

(65) Prior Publication Data

US 2024/0259750 A1 Aug. 1, 2024

Related U.S. Application Data

(60) Continuation of application No. 18/159,135, filed on Jan. 25, 2023, now Pat. No. 11,895,482, which is a (Continued)

(30) Foreign Application Priority Data

Mar. 6, 2012 (EP) .................................. 123052714

(51) Int. Cl.

*H04S 7/00* (2006.01)
*G10L 19/008* (2013.01)
*H04R 5/00* (2006.01)

(52) U.S. Cl.

CPC ............ *H04S 7/302* (2013.01); *G10L 19/008* (2013.01); *H04R 5/00* (2013.01); *H04S 7/305* (2013.01); *H04S 2420/11* (2013.01)

(58) Field of Classification Search

CPC ...... H04S 7/302; H04S 7/305; H04S 2420/11; G10L 19/008; H04R 5/00

(Continued)

(56) References Cited

U.S. PATENT DOCUMENTS

| | | | |
|---|---|---|---|
| 6,694,033 | B1 | 2/2004 | Rimell |
| 2003/0118192 | A1 | 6/2003 | Sasaki |

(Continued)

FOREIGN PATENT DOCUMENTS

| | | | |
|---|---|---|---|
| EP | 1318502 A2 | 6/2003 | |
| EP | 2205007 A1 | 7/2010 | |

(Continued)

OTHER PUBLICATIONS

Brix, et al. "CARROUSO—An European Approach to 3D-Audio", Audio Engineering Society, Convention Paper 5314 presented at the 110th Convention, Amsterdam, The Netherlands, p. 1-7 (May 12-15, 2001).

(Continued)

*Primary Examiner* — Ahmad F. Matar
*Assistant Examiner* — Jirapon Tulop

(57) ABSTRACT

A method for generating loudspeaker signals associated with a target screen size is disclosed. The method includes receiving a bit stream containing encoded higher order ambisonics signals, the encoded higher order ambisonics signals describing a sound field associated with a production screen size. The method further includes decoding the encoded higher order ambisonics signals to obtain a first set of decoded higher order ambisonics signals representing dominant components of the sound field and a second set of (Continued)

decoded higher order ambisonics signals representing ambient components of the sound field. The method also includes combining the first set of decoded higher order ambisonics signals and the second set of decoded higher order ambisonics signals to produce a combined set of decoded higher order ambisonics signals.

3 Claims, 3 Drawing Sheets

Related U.S. Application Data continuation of application No. 17/558,581, filed on Dec. 21, 2021, now Pat. No. 11,570,566, which is a continuation of application No. 17/003,289, filed on Aug. 26, 2020, now Pat. No. 11,228,856, which is a division of application No. 16/374,665, filed on Apr. 3, 2019, now Pat. No. 10,771,912, which is a division of application No. 15/220,766, filed on Jul. 27, 2016, now Pat. No. 10,299,062, which is a continuation of application No. 13/786,857, filed on Mar. 6, 2013, now Pat. No. 9,451,363.

(58) Field of Classification Search
USPC .......................................................... 381/22
See application file for complete search history.

(56) References Cited

U.S. PATENT DOCUMENTS

| | | | |
|---|---|---|---|
| 2008/0004729 A1 | 1/2008 | Hiipakka |
| 2009/0238371 A1 | 9/2009 | Rumsey |
| 2010/0328419 A1 | 12/2010 | Etter |
| 2010/0328423 A1 | 12/2010 | Etter |
| 2013/0216070 A1 | 8/2013 | Keiler et al. |
| 2016/0104495 A1 | 4/2016 | Peters |

FOREIGN PATENT DOCUMENTS

| | | | |
|---|---|---|---|
| EP | 2541547 | A1 | 1/2013 |
| JP | 2002505058 | A | 2/2002 |
| JP | 2007-201818 | A | 8/2007 |
| JP | 2009-278381 | A | 11/2009 |
| JP | 2009-543479 | A | 12/2009 |
| JP | 2011-035784 | A | 2/2011 |
| JP | 2011-188287 | A | 9/2011 |
| JP | 2012-513138 | A | 6/2012 |
| JP | 2013-521725 | A | 6/2013 |
| JP | 2014-523172 | A | 9/2014 |
| JP | 6325718 | B2 | 5/2018 |
| JP | 4347422 | B2 | 10/2019 |
| WO | 98/58523 | A1 | 12/1998 |
| WO | 00/21444 | A1 | 4/2000 |
| WO | 2004/073352 | A1 | 8/2004 |
| WO | 2006/009004 | A1 | 5/2008 |
| WO | 2009/116800 | A2 | 9/2009 |
| WO | 2011/005025 | A2 | 1/2011 |
| WO | 2011117399 | A1 | 9/2011 |
| WO | 2011119401 | A2 | 9/2011 |
| WO | 2012/059385 | A1 | 5/2012 |
| WO | 2012093352 | A1 | 7/2012 |

OTHER PUBLICATIONS

Hollerweger Florian "An Introduction to Higher Order Ambisonic" pp. 1-13, http://flo.mur.at/writings/HOA-intro.pdf, access date Sep. 9, 2016.
Horbach, Ulrich et al. "Real-Time Rendering of Dynamic Scenes Using Wave Field Synthesis", IEEE, p. 517-520, Aug. 2002.
Katsumoto et al., "A novel 3D Audio display system using radiated Loudspeaker for Future 3D Multimodal Communications", 3DTV Conference: The True Vision—Capture, Transmission and Display of 3D Video, Potsdam, May 4, 2009, pp. 1-4.
Pomberger, H. et al."Warping of 3D Ambisonic Recordings" Ambisonics Symposium, Jun. 2011, pp. 1-8.
Pomberger, Hannes et al. "An Ambisonics Format for Flexible Playback Layouts", Ambisonics Symposium 2009, Graz, Austria, 8 pages (Jun. 25-29, 2009).
Schultz-Amling, Richard et al. "Acoustical Zooming Based on a Parametric Sound Field Representation", Audio Engineering Society, Convention Paper 8120 presented at the 28th Convention, London, UK, 9 pp. 1-9, May 22-25, 2010.
Zotter, Franz et al. "Ambisonic Decoding With and Without Mode-Matching: a Case Study Using the Hemisphere", Proc. of the 2nd International Symposium on Ambisonics and Spherical Acoustics, Paris, France, 11 pages (May 6-7, 2010).

METHOD AND APPARATUS FOR SCREEN RELATED ADAPTATION OF A HIGHER-ORDER AMBISONICS AUDIO SIGNAL

CROSS-REFERENCE TO RELATED APPLICATIONS

This application is a continuation of U.S. patent application Ser. No. 18/159,135, filed Jan. 25, 2023, which is a continuation of U.S. patent application Ser. No. 17/558,581, filed Dec. 21, 2021, now U.S. Pat. No. 11,570,566, which is a continuation of U.S. patent application Ser. No. 17/003,289, filed Aug. 26, 2020, now U.S. Pat. No. 11,228,856, which is a divisional of U.S. patent application Ser. No. 16/374,665, filed Apr. 3, 2019, now U.S. Pat. No. 10,771,912, which is a divisional of U.S. patent application Ser. No. 15/220,766, filed Jul. 27, 2016, now U.S. Pat. No. 10,299,062, which is a continuation of U.S. patent application Ser. No. 13/786,857, filed Mar. 6, 2013, now U.S. Pat. No. 9,451,363, which claims priority to European Patent Application No. 12305271.4, filed Mar. 6, 2012, each of which is hereby incorporated by reference in its entirety.

TECHNICAL FIELD

The invention relates to a method and to an apparatus for playback of an original Higher-Order Ambisonics audio signal assigned to a video signal that is to be presented on a current screen but was generated for an original and different screen.

BACKGROUND

One way to store and process the three-dimensional sound field of spherical microphone arrays is the Higher-Order Ambisonics (HOA) representation. Ambisonics uses orthonormal spherical functions for describing the sound field in the area around and at the point of origin, or the reference point in space, also known as the sweet spot. The accuracy of such description is determined by the Ambisonics order N, where a finite number of Ambisonics coefficients are describing the sound field. The maximum Ambisonics order of a spherical array is limited by the number of microphone capsules, which number must be equal to or greater than the number $O=(N+1)^2$ of Ambisonics coefficients.

An advantage of such Ambisonics representation is that the reproduction of the sound field can be adapted individually to nearly any given loudspeaker position arrangement. Invention While facilitating a flexible and universal representation of spatial audio largely independent from loudspeaker setups, the combination with video playback on differently-sized screens may become distracting because the spatial sound playback is not adapted accordingly.

Stereo and surround sound are based on discrete loudspeaker channels, and there exist very specific rules about where to place loudspeakers in relation to a video display. For example in theatrical environments, the centre speaker is positioned at the centre of the screen and the left and right loudspeakers are positioned at the left and right sides of the screen. Thereby the loudspeaker setup inherently scales with the screen: for a small screen the speakers are closer to each other and for a huge screen they are farther apart. This has the advantage that sound mixing can be done in a very coherent manner: sound objects that are related to visible objects on the screen can be reliably positioned between the left, centre and right channels. Hence, the experience of listeners matches the creative intent of the sound artist from the mixing stage.

But such advantage is at the same time a disadvantage of channel-based systems: very limited flexibility for changing loudspeaker settings. This disadvantage increases with increasing number of loudspeaker channels. E.g. 7.1 and 22.2 formats require precise installations of the individual loudspeakers and it is extremely difficult to adapt the audio content to sub-optimal loudspeaker positions.

Another disadvantage of channel-based formats is that the precedence effect limits the capabilities of panning sound objects between left, centre and right channels, in particular for large listening setups like in a theatrical environment. For off-centre listening positions a panned audio object may 'fall' into the loudspeaker nearest to the listener. Therefore, many movies have been mixed with important screen-related sounds, especially dialog, being mapped exclusively to the centre channel, whereby a very stable positioning of those sounds on the screen is obtained, but at the cost of a sub-optimal spaciousness of the overall sound scene.

A similar compromise is typically chosen for the back surround channels: because the precise location of the loudspeakers playing those channels is hardly known in production, and because the density of those channels is rather low, usually only ambient sound and uncorrelated items are mixed to the surround channels. Thereby the probability of significant reproducing errors in surround channels can be reduced, but at the cost of not being able to faithfully place discrete sound objects anywhere but on the screen (or even in the centre channel as discussed above).

As mentioned above, the combination of spatial audio with video playback on differently-sized screens may become distracting because the spatial sound playback is not adapted accordingly. The direction of sound objects can diverge from the direction of visible objects on a screen, depending on whether or not the actual screen size matches that used in the production. For instance, if the mixing has been carried out in an environment with a small screen, sound objects which are coupled to screen objects (e.g. voices of actors) will be positioned within a relatively narrow cone as seen from the position of the mixer. If this content is mastered to a sound-field-based representation and played back in a theatrical environment with a much larger screen, there is a significant mismatch between the wide field of view to the screen and the narrow cone of screen-related sound objects. A large mismatch between the position of the visible image of an object and the location of the corresponding sound distracts the viewers and thereby seriously impacts the perception of a movie.

More recently, parametric or object-oriented representations of audio scenes have been proposed which describe the audio scene by a composition of individual audio objects together with a set of parameters and characteristics. For instance, object-oriented scene description has been proposed largely for addressing wave-field synthesis systems, e.g. in Sandra Brix, Thomas Sporer, Jan Plogsties, "CARROUSO—An European Approach to 3D-Audio", Proc. of 110th AES Convention, Paper 5314, 12-15 May 2001, Amsterdam, The Netherlands, and in Ulrich Horbach, Etienne Corteel, Renato S. Pellegrini and Edo Hulsebos, "Real-Time Rendering of Dynamic Scenes Using Wave Field Synthesis", Proc. of IEEE Intl. Conf. on Multimedia and Expo (ICME), pp. 517-520, August 2002, Lausanne, Switzerland.

EP 1518443 B1 describes two different approaches for addressing the problem of adapting the audio playback to the visible screen size. The first approach determines the playback position individually for each sound object in dependence on its direction and distance to the reference point as well as parameters like aperture angles and positions of both camera and projection equipment. In practice, such tight coupling between visibility of objects and related sound mixing is not typical—in contrast, some deviation of sound mix from related visible objects may in fact be tolerated for artistic reasons. Furthermore, it is important to distinguish between direct sound and ambient sound. Last but not least, the incorporation of physical camera and projection parameters is rather complex, and such parameters are not always available. The second approach (cf. claim 16) describes a pre-computation of sound objects according to the above procedure, but assuming a screen with a fixed reference size. The scheme requires a linear scaling of all position parameters (in Cartesian coordinates) for adapting the scene to a screen that is larger or smaller than the reference screen. This means, however, that adaptation to a double-size screen results also in a doubling of the virtual distance to sound objects. This is a mere 'breathing' of the acoustic scene, without any change in angular locations of sound objects with respect to the listener in the reference seat (i.e. sweet spot). It is not possible by this approach to produce faithful listening results for changes of the relative size (aperture angle) of the screen in angular coordinates.

Another example of an object-oriented sound scene description format is described in EP 1318502 B1. Here, the audio scene comprises, besides the different sound objects and their characteristics, information on the characteristics of the room to be reproduced as well as information on the horizontal and vertical opening angle of the reference screen. In the decoder, similar to the principle in EP 1518443 B1, the position and size of the actual available screen is determined and the playback of the sound objects is individually optimised to match with the reference screen.

E.g. in PCT/EP2011/068782, sound-field oriented audio formats like higher-order Ambisonics HOA have been proposed for universal spatial representation of sound scenes, and in terms of recording and playback, a sound-field oriented processing provides an excellent trade-off between universality and practicality because it can be scaled to virtually arbitrary spatial resolution, similar to that of object-oriented formats. On the other hand, a number of straightforward recording and production techniques exist which allow deriving natural recordings of real sound fields, in contrast to the fully synthetic representation required for object-oriented formats. Obviously, because sound-field oriented audio content does not comprise any information on individual sound objects, the mechanisms introduced above for adapting object-oriented formats to different screen sizes cannot be applied.

As of today, only few publications are available that describe means to manipulate the relative positions of individual sound objects contained in a sound-field oriented audio scene. One family of algorithms described e.g. in Richard Schultz-Amling, Fabian Kuech, Oliver Thiergart, Markus Kallinger, "Acoustical Zooming Based on a Parametric Sound Field Representation", 128th AES Convention, Paper 8120, 22-25 May 2010, London, UK, requires a decomposition of the sound field into a limited number of discrete sound objects. The location parameters of these sound objects can be manipulated. This approach has the disadvantage that audio scene decomposition is error-prone and that any error in determining the audio objects will likely lead to artefacts in sound rendering.

Many publications are related to optimisation of playback of HOA content to 'flexible playback layouts', e.g. the above-cited Brix article and Franz Zotter, Hannes Pomberger, Markus Noisternig, "Ambisonic Decoding With and Without Mode-Matching: A Case Study Using the Hemisphere", Proc. of the 2nd International Symposium on Ambisonics and Spherical Acoustics, 6-7 May 2010, Paris, France. These techniques tackle the problem of using irregularly spaced loudspeakers, but none of them targets at changing the spatial composition of the audio scene.

A problem to be solved by the invention is adaptation of spatial audio content, which has been represented as coefficients of a sound-field decomposition, to differently-sized video screens, such that the sound playback location of on-screen objects is matched with the corresponding visible location. Specifically, a method for generating loudspeaker signals associated with a target screen size is disclosed. The method includes receiving a bit stream containing encoded higher order ambisonics signals, the encoded higher order ambisonics signals describing a sound field associated with a production screen size. The method further includes decoding the encoded higher order ambisonics signals to obtain a first set of decoded higher order ambisonics signals representing dominant components of the sound field and a second set of decoded higher order ambisonics signals representing ambient components of the sound field. The method also includes combining the first set of decoded higher order ambisonics signals and the second set of decoded higher order ambisonics signals to produce a combined set of decoded higher order ambisonics signals and generating the loudspeaker signals by rendering the combined set of decoded higher order ambisonics signals. The rendering adapts in response to the production screen size and the target screen size.

The invention allows systematic adaptation of the playback of spatial sound field-oriented audio to its linked visible objects. Thereby, a significant prerequisite for faithful reproduction of spatial audio for movies is fulfilled.

According to the invention, sound-field oriented audio scenes are adapted to differing video screen sizes by applying space warping processing as disclosed in EP 11305845.7, in combination with sound-field oriented audio formats, such as those disclosed in PCT/EP2011/068782 and EP 11192988.0. An advantageous processing is to encode and transmit the reference size (or the viewing angle from a reference listening position) of the screen used in the content production as metadata together with the content.

Alternatively, a fixed reference screen size is assumed in encoding and for decoding, and the decoder knows the actual size of the target screen. The decoder warps the sound field in such a manner that all sound objects in the direction of the screen are compressed or stretched according to the ratio of the size of the target screen and the size of the reference screen. This can be accomplished for example with a simple two-segment piecewise linear warping function as explained below. In contrast to the state-of-the-art described above, this stretching is basically limited to the angular positions of sound items, and it does not necessarily result in changes of the distance of sound objects to the listening area.

Several embodiments of the invention are described below, which allow taking control on what part of an audio scene shall be manipulated or not.

In principle, the inventive method is suited for playback of an original Higher-Order Ambisonics audio signal assigned to a video signal that is to be presented on a current screen but was generated for an original and different screen, said method including the steps:

decoding said Higher-Order Ambisonics audio signal so as to provide decoded audio signals;

receiving or establishing reproduction adaptation information derived from the difference between said original screen and said current screen in their widths and possibly their heights and possibly their curvatures;

adapting said decoded audio signals by warping them in the space domain, wherein said reproduction adaptation information controls said warping such that for a current-screen watcher and listener of said adapted decoded audio signals the perceived position of at least one audio object represented by said adapted decoded audio signals matches the perceived position of a related video object on said screen;

rendering and outputting for loudspeakers the adapted decoded audio signals.

In principle the inventive apparatus is suited for playback of an original Higher-Order Ambisonics audio signal assigned to a video signal that is to be presented on a current screen but was generated for an original and different screen, said apparatus including:

means being adapted for decoding said Higher-Order Ambisonics audio signal so as to provide decoded audio signals;

means being adapted for receiving or establishing reproduction adaptation information derived from the difference between said original screen and said current screen in their widths and possibly their heights and possibly their curvatures;

means being adapted for adapting said decoded audio signals by warping them in the space domain, wherein said reproduction adaptation information controls said warping such that for a current-screen watcher and listener of said adapted decoded audio signals the perceived position of at least one audio object represented by said adapted decoded audio signals matches the perceived position of a related video object on said screen;

means being adapted for rendering and outputting for loudspeakers the adapted decoded audio signals.

DRAWINGS

Exemplary embodiments of the invention are described with reference to the accompanying drawings, which show in:

EXEMPLARY EMBODIMENTS

Figure 1:
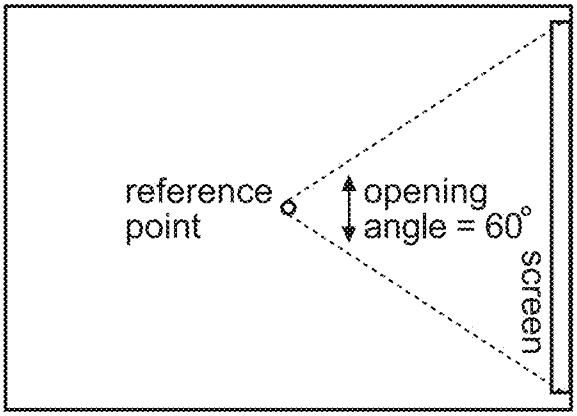
FIG. 1 illustrates an exemplary studio environment.
Figure 2:
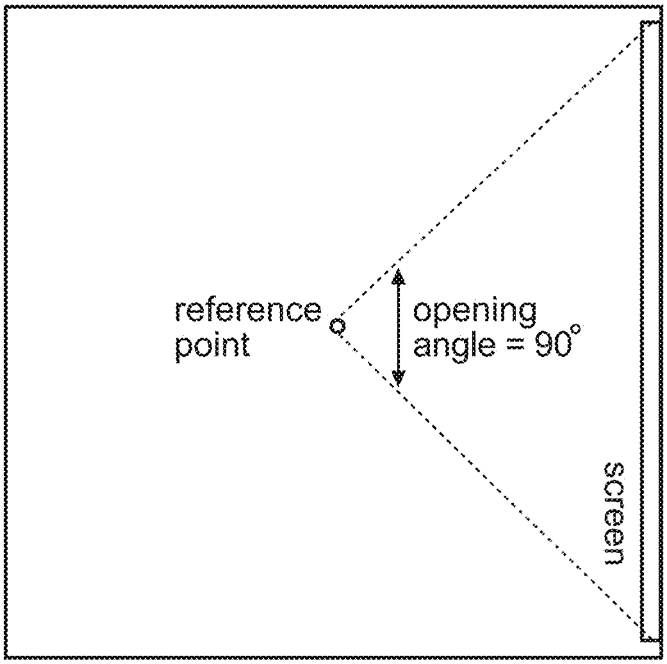
FIG. 2 illustrates an exemplary cinema environment.

FIG. 1 shows an example studio environment with a reference point and a screen, and FIG. 2 shows an example cinema environment with reference point and screen. Different projection environments lead to different opening angles of the screen as seen from the reference point. With state-of-the-art sound-field-oriented playback techniques, the audio content produced in the studio environment (opening angle 60°) will not match the screen content in the cinema environment (opening angle 90°). The opening angle 60° in the studio environment has to be transmitted together with the audio content in order to allow for an adaptation of the content to the differing characteristics of the playback environments.

For comprehensibility, these figures simplify the situation to a 2D scenario.

In higher-order Ambisonics theory, a spatial audio scene is described via the coefficients $A_n^m(k)$ of a Fourier-Bessel series. For a source-free volume the sound pressure is described as a function of spherical coordinates (radius r, inclination angle θ, azimuth angle ϕ and spatial frequency $$k = \frac{\omega}{c}$$

(c is the speed of sound in the air):

$$p(r, \theta, \phi, k) = \sum_{n=0}^{N} \sum_{m=-n}^{n} A_n^m(k)\, j_n(kr)\, Y_n^m(\theta, \phi),$$

where $j_n(kr)$ are the Spherical-Bessel functions of first kind which describe the radial dependency, $Y_n^m(\theta, \phi)$ are the Spherical Harmonics (SH) which are real-valued in practice, and N is the Ambisonics order.

The spatial composition of the audio scene can be warped by the techniques disclosed in EP 11305845.7.

The relative positions of sound objects contained within a two-dimensional or a three-dimensional Higher-Order Ambisonics HOA representation of an audio scene can be changed, wherein an input vector $A_{in}$ with dimension $O_{in}$ determines the coefficients of a Fourier series of the input signal and an output vector $A_{out}$ with dimension $O_{out}$ determines the coefficients of a Fourier series of the correspondingly changed output signal. The input vector $A_{in}$ of input HOA coefficients is decoded into input signals $s_{in}$ in space domain for regularly positioned loudspeaker positions using the inverse $\Psi_1^{-1}$ of a mode matrix $\Psi_1$ by calculating $s_{in}=\Psi_1^{-1}A_{in}$. The input signals $s_{in}$ are warped and encoded in space domain into the output vector $A_{out}$ of adapted output HOA coefficients by calculating $A_{out}=\Psi_2 s_{in}$, wherein the mode vectors of the mode matrix $\Psi_2$ are modified according to a warping function $f(\phi)$ by which the angles of the original loudspeaker positions are one-to-one mapped into the target angles of the target loudspeaker positions in the output vector $A_{out}$.

The modification of the loudspeaker density can be countered by applying a gain weighting function $g(\phi)$ to the virtual loudspeaker output signals $s_{in}$, resulting in signal $S_{out}$. In principle, any weighting function $g(\phi)$ can be specified. One particular advantageous variant has been determined empirically to be proportional to the derivative of the warping function $f(\phi)$:

$$g(\phi) = \frac{d f_\phi(\phi)}{d\phi}.$$

With this specific weighting function, under the assumption of appropriately high inner order and output order, the amplitude of a panning function at a specific warped angle $f(\phi)$ is kept equal to the original panning function at the original angle $\phi$. Thereby, a homogeneous sound balance (amplitude) per opening angle is obtained. For three-dimensional Ambisonics the gain function is $$g(\theta,\phi)=\frac{df_\theta(\theta)}{d\theta}\cdot\frac{\arccos\left((\cos f_\theta(\theta_{in}))^2+(\sin f_\theta(\theta_{in}))^2\cos\phi_\varepsilon\right)}{\arccos\left((\cos\theta_{in})^2+(\sin\theta_{in})^2\cos\phi_\varepsilon\right)}$$

in the $\phi$ direction and in the $\theta$ direction, wherein $\phi_\varepsilon$ is a small azimuth angle.

The decoding, weighting and warping/decoding can be commonly carried out by using a size $O_{warp}\times O_{warp}$ transformation matrix $T=\mathrm{diag}(w)\,\Psi_2\mathrm{diag}(g)\Psi_1^{-1}$, wherein diag (w) denotes a diagonal matrix which has the values of the window vector w as components of its main diagonal and diag(g) denotes a diagonal matrix which has the values of the gain function g as components of its main diagonal.

In order to shape the transformation matrix T so as to get a size $O_{out}\times O_{in}$, the corresponding columns and/or lines of the transformation matrix T are removed so as to perform the space warping operation $A_{out}=T\,A_{in}$.

FIG. 3 to FIG. 7 illustrate space warping in the two-dimensional (circular) case, and show an example piece-wise-linear warping function for the scenario in FIG. 1/2 and its impact to the panning functions of 13 regular-placed example loudspeakers. The system stretches the sound field in the front by a factor of 1.5 to adapt to the larger screen in the cinema. Accordingly, the sound items coming from other directions are compressed.

Figure 3:
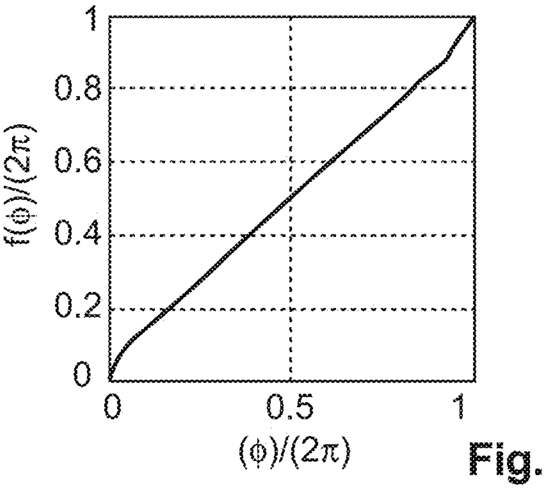
FIG. 3 illustrates an exemplary warping function $f(\phi)$.
Figure 4:
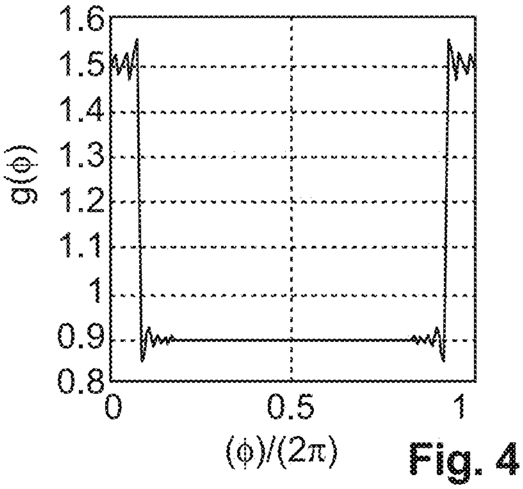
FIG. 4 illustrates an exemplary weighting function $g(\phi)$.

The warping function $f(\phi)$ resembles the phase response of a discrete-time allpass filter with a single real-valued parameter and is shown in FIG. 3. The corresponding weighting function $g(\phi)$ is shown in FIG. 4.

Figure 7:
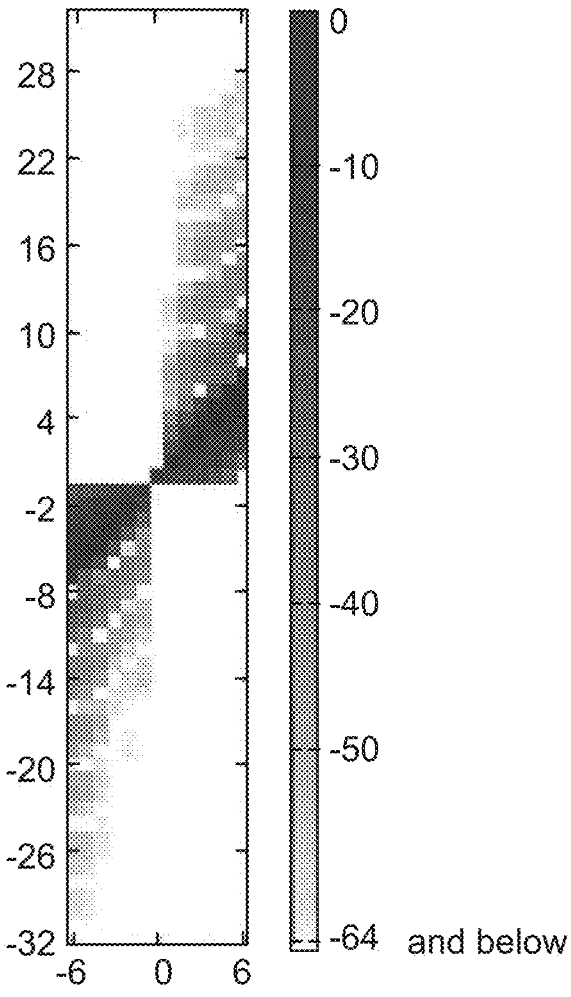
FIG. 7 illustrates an exemplary warping matrix.

FIG. 7 depicts the 13×65 single-step transformation warping matrix T. The logarithmic absolute values of individual coefficients of the matrix are indicated by the gray scale or shading types according to the attached gray scale or shading bar. This example matrix has been designed for an input HOA order of $N_{orig}=6$ and an output order of $N_{warp}=32$. The higher output order is required in order to capture most of the information that is spread by the transformation from low-order coefficients to higher-order coefficients.

A useful characteristic of this particular warping matrix is that significant portions of it are zero. This allows saving a lot of computational power when implementing this operation.

Figure 5:
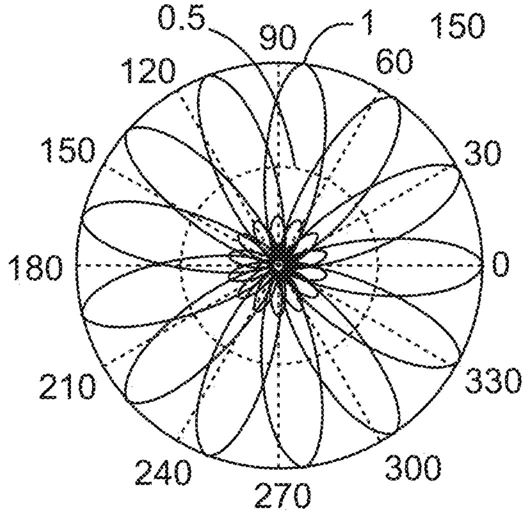
FIG. 5 illustrates exemplary original weights.
Figure 6:
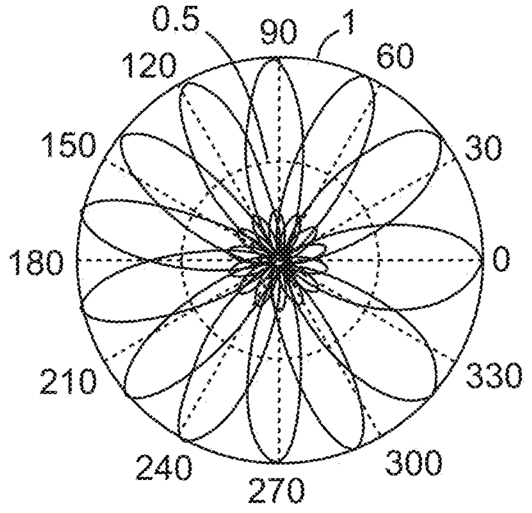
FIG. 6 illustrates exemplary weights following warping.

FIG. 5 and FIG. 6 illustrate the warping characteristics of beam patterns produced by some plane waves. Both figures result from the same thirteen input plane waves at $\phi$ positions 0, 2/13π, 4/13π, 6/13π, . . . , 22/13π and 24/13π, all with identical amplitude of 'one', and show the thirteen angular amplitude distributions, i.e. the result vector s of the overdetermined, regular decoding operation $s=\Psi^{-1}A$, where the HOA vector A is either the original or the warped variant of the set of plane waves. The numbers outside the circle represent the angle $\phi$. The number of virtual loudspeakers is considerably higher than the number of HOA parameters. The amplitude distribution or beam pattern for the plane wave coming from the front direction is located at $\phi=0$.

FIG. 5 shows the weights and amplitude distribution of the original HOA representation. All thirteen distributions are shaped alike and feature the same width of the main lobe. FIG. 6 shows the weights and amplitude distributions for the same sound objects, but after the warping operation has been performed. The objects have moved away from the front direction of $\phi=0$ degrees and the main lobes around the front direction have become broader. These modifications of beam patterns are facilitated by the higher order $N_{warp}=32$ of the warped HOA vector. A mixed-order signal has been created with local orders varying over space.

In order to derive suitable warping characteristics $f(\phi_{in})$ for adapting the playback of the audio scene to an actual screen configuration, additional information is sent or provided besides the HOA coefficients. For instance, the following characterisation of the reference screen used in the mixing process can be included in the bit stream:

- the direction of the centre of the screen,
- the width,
- the height of the reference screen, all in polar coordinates measured from the reference listening position (aka 'sweet spot').

Additionally, the following parameters may be required for special applications:

- the shape of the screen, e.g. whether it is flat or spherical,
- the distance of the screen,
- information on maximum and minimum visible depth in the case of stereoscopic 3D video projection.

How such metadata can be encoded is known to those skilled in the art.

In the sequel, it is assumed that the encoded audio bit stream includes at least the above three parameters, the direction of the centre, the width and the height of the reference screen. For comprehensibility, it is further assumed that the centre of the actual screen is identical to the centre of the reference screen, e.g. directly in front of the listener. Moreover, it is assumed that the sound field is represented in 2D format only (as compared to 3D format) and that the change in inclination for this be ignored (for example, as when the HOA format selected represents no vertical component, or where a sound editor judges that mismatches between the picture and the inclination of on-screen sound sources will be sufficiently small such that casual observers will not notice them). The transition to arbitrary screen positions and the 3D case is straight-forward to those skilled in the art. Further, it is assumed for simplicity that the screen construction is spherical.

With these assumptions, only the width of the screen can vary between content and actual setup. In the following a suitable two-segment piecewise-linear warping characteristic is defined. The actual screen width is defined by the opening angle $2\phi_{w,a}$ (i.e. $\phi_{w,a}$ describes the half-angle). The reference screen width is defined by the angle $\phi_{w,r}$ and this value is part of the meta information delivered within the bit stream. For a faithful reproduction of sound objects in front direction, i.e. on the video screen, all positions (in polar coordinates) of sound objects are to be multiplied by the factor $\phi_{w,a}/\phi_{w,r}$. Conversely, all sound objects in other directions shall be moved according to the remaining space. The warping characteristics results to $$\phi_{out}=\begin{cases}\phi_{w,a}/\phi_{w,r}\cdot\phi_{in} & -\phi_{w,r}\le\phi_{in}\le\phi_{w,r}\\ \dfrac{(\pi-\phi_{w,a})}{(\pi-\phi_{w,r})}\cdot[\phi_{in}-\pi]+\pi & \text{otherwise}\end{cases}.$$

The warping operation required for obtaining this characteristic can be constructed with the rules disclosed in EP 11305845.7. For instance, as a result a single-step linear warping operator can be derived which is applied to each HOA vector before the manipulated vector is input to the HOA rendering processing.

The above example is one of many possible warping characteristics. Other characteristics can be applied in order to find the best trade-off between complexity and the amount of distortion remaining after the operation. For example, if the simple piecewise-linear warping characteristic is applied for manipulating 3D sound-field rendering, typical pincushion or barrel distortion of the spatial reproduction can be produced, but if the factor $\phi_{w,a}/\phi_{w,r}$ is near 'one', such distortion of the spatial rendering can be neglected. For very large or very small factors, more sophisticated warping characteristics can be applied which minimise spatial distortion.

Additionally, if the HOA representation chosen does provide for inclination and a sound editor considers that the vertical angle subtended by the screen is of interest, then a similar equation, based on the angular height of the screen $\theta_h$ (half-height) and the related factors (e.g. the actual height-to-reference-height ratio $\theta_{h,a}/\theta_{h,r}$) can be applied to the inclination as part of the warping operator.

As another example, assuming in front of the listener a flat screen instead of a spherical screen may require more elaborate warping characteristics than the exemplary one described above. Again, this could concern itself with either the width-only, or the width+height warp.

The exemplary embodiment described above has the advantage of being fixed and rather simple to implement. On the other hand, it does not allow for any control of the adaptation process from production side. The following embodiments introduce processings for more control in different ways.

Embodiment 1: Separation Between Screen-Related Sound and Other Sound

Such control technique may be required for various reasons. For example, not all of the sound objects in an audio scene are directly coupled with a visible object on screen, and it can be advantageous to manipulate direct sound differently than ambience. This distinction can be performed by scene analysis at the rendering side. However, it can be significantly improved and controlled by adding additional information to the transmission bit stream. Ideally, the decision of which sound items to be adapted to actual screen characteristics—and which ones to be leaved untouched—should be left to the artist doing the sound mix.

Different ways are possible for transmitting this information to the rendering process:

- Two full sets of HOA coefficients (signals) are defined within the bit stream, one for describing objects which are related to visible items and the other one for representing independent or ambient sound. In the decoder, only the first HOA signal will undergo adaptation to the actual screen geometry while the other one is left untouched. Before playback, the manipulated first HOA signal and the unmodified second HOA signal are combined.

As an example, a sound engineer may decide to mix screen-related sound like dialog or specific Foley items to the first signal, and to mix the ambient sounds to the second signal. In that way, the ambience will always remain identical, no matter which screen is used for playback of the audio/video signal.

This kind of processing has the additional advantage that the HOA orders of the two constituting sub-signals can be individually optimised for the specific type of signal, whereby the HOA order for screen-related sound objects (i.e. the first sub-signal) is higher than that used for ambient signal components (i.e. the second sub-signal).

- Via flags attached to time-space-frequency tiles, the mapping of sound is defined to be screen-related or independent. For this purpose the spatial characteristics of the HOA signal are determined, e.g. via a plane wave decomposition. Then, each of the spatial-domain signals is input to a time segmentation (windowing) and time-frequency transformation. Thereby a three-dimensional set of tiles will be defined which can be individually marked, e.g. by a binary flag stating whether or not the content of that tile shall be adapted to actual screen geometry. This sub-embodiment is more efficient than the previous sub-embodiment, but it limits the flexibility of defining which parts of a sound scene shall be manipulated or not.

Embodiment 2: Dynamic Adaptation

In some applications it will be required to change the signalled reference screen characteristics in a dynamic manner. For instance, audio content may be the result of concatenating repurposed content segments from different mixes. In this case, the parameters describing the reference screen parameters will change over time, and the adaptation algorithm is changed dynamically: for every change of screen parameters the applied warping function is re-calculated accordingly.

Another application example arises from mixing different HOA streams which have been prepared for different subparts of the final visible video and audio scene. Then it is advantageous to allow for more than one (or more than two with embodiment 1 above) HOA signals in a common bit stream, each with its individual screen characterisation.

Embodiment 3: Alternative Implementation

Instead of warping the HOA representation prior to decoding via a fixed HOA decoder, the information on how to adapt the signal to actual screen characteristics can be integrated into the decoder design. This implementation is an alternative to the basic realisation described in the exemplary embodiment above. However, it does not change the signalling of the screen characteristics within the bit stream.

Figure 8:
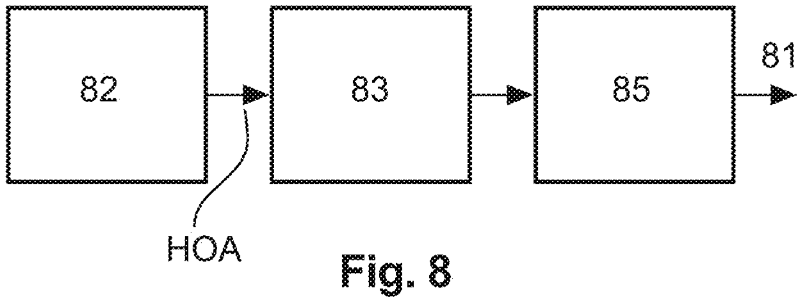
FIG. 8 illustrates exemplary HOA processing.

In FIG. 8, HOA encoded signals are stored in a storage device 82. For presentation in a cinema, the HOA represented signals from device 82 are HOA decoded in an HOA decoder 83, pass through a renderer 85, and are output as loudspeaker signals 81 for a set of loudspeakers.

Figure 9:
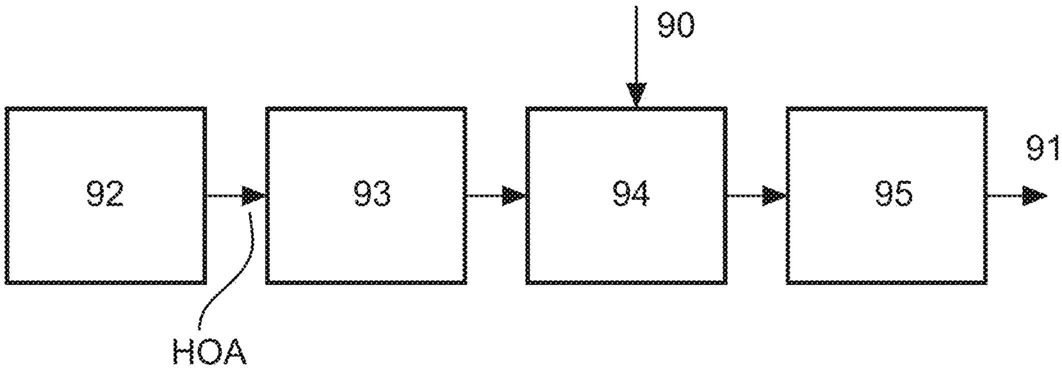
FIG. 9 illustrates an exemplary method in accordance to the present invention.

In FIG. 9, HOA encoded signal are stored in a storage device 92. For presentation e.g. in a cinema, the HOA represented signals from device 92 are HOA decoded in an HOA decoder 93, pass through a warping stage 94 to a renderer 95, and are output as loudspeaker signals 91 for a set of loudspeakers. The warping stage 94 receives the reproduction adaptation information 90 described above and uses it for adapting the decoded HOA signals accordingly.

The invention claimed is:

1. A method for decoding encoded higher order ambisonics (HOA) signals describing a sound field, the method comprising:

decoding, by one or more processors, the encoded HOA signals to obtain a first set of decoded HOA signals representing dominant components of the sound field and a second set of decoded HOA signals representing ambient components of the sound field;

combining, by one or more processors, the first set of decoded HOA signals and the second set of decoded HOA signals to produce a combined set of decoded HOA signals; and determining, by one or more processors, a transformation matrix for warping the combined set of decoded HOA signals, wherein the transformation matrix is based on a production screen size and a target screen size, and wherein the transformation matrix is further based on a diagonal matrix of loudspeaker correction gains.

2. A non-transitory computer readable medium containing instructions that when executed by a processor perform the method of claim 1.

3. An apparatus for decoding encoded higher order ambisonics (HOA) signals describing a sound field, the apparatus comprising:

an audio decoder for decoding the encoded HOA signals to obtain a first set of decoded HOA signals representing dominant components of the sound field and a second set of decoded HOA signals representing ambient components of the sound field;

a combiner for integrating the first set of decoded HOA signals and the second set of decoded HOA signals to produce a combined set of decoded HOA signals; and a processor for determining a transformation matrix for warping the combined set of decoded HOA signals, wherein the transformation matrix is based on a production screen size and a target screen size, and wherein the transformation matrix is further based on a diagonal matrix of loudspeaker correction gains.

* * * * *